A. D. ZIEBARTH AND A. V. MAGNUSON.
MOLDING MACHINE.
APPLICATION FILED DEC. 30, 1918.
1,316,666.
Patented Sept. 23, 1919.
4 SHEETS—SHEET 3.
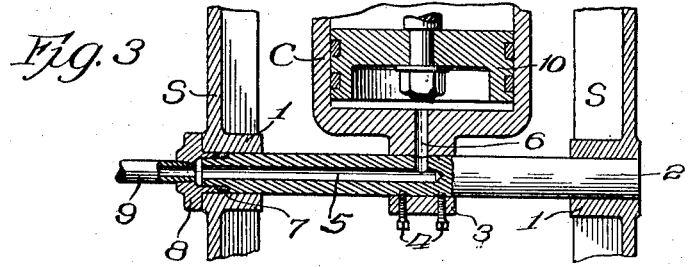
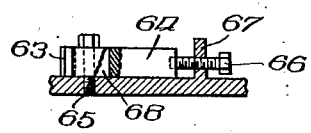
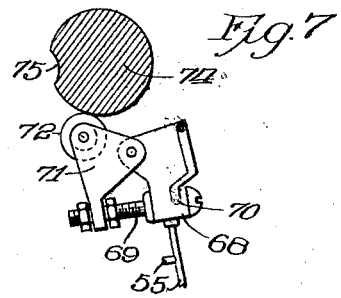
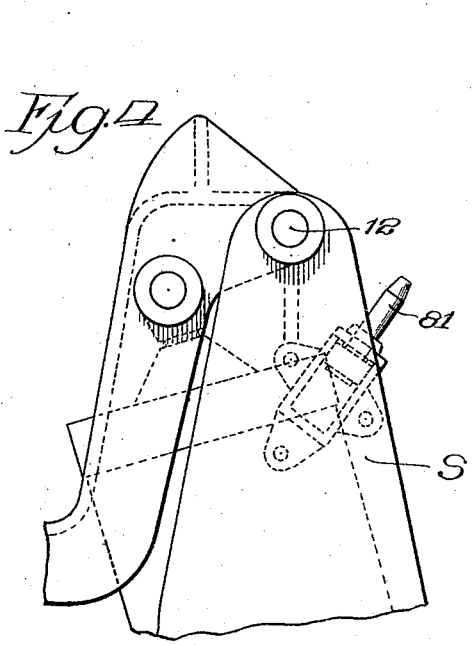
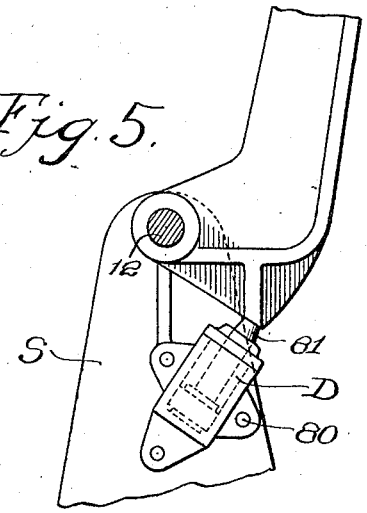
Inventors:
Arthur D. Ziebarth
Alfred V. Magnuson
By Taylor Brown
their Atty.

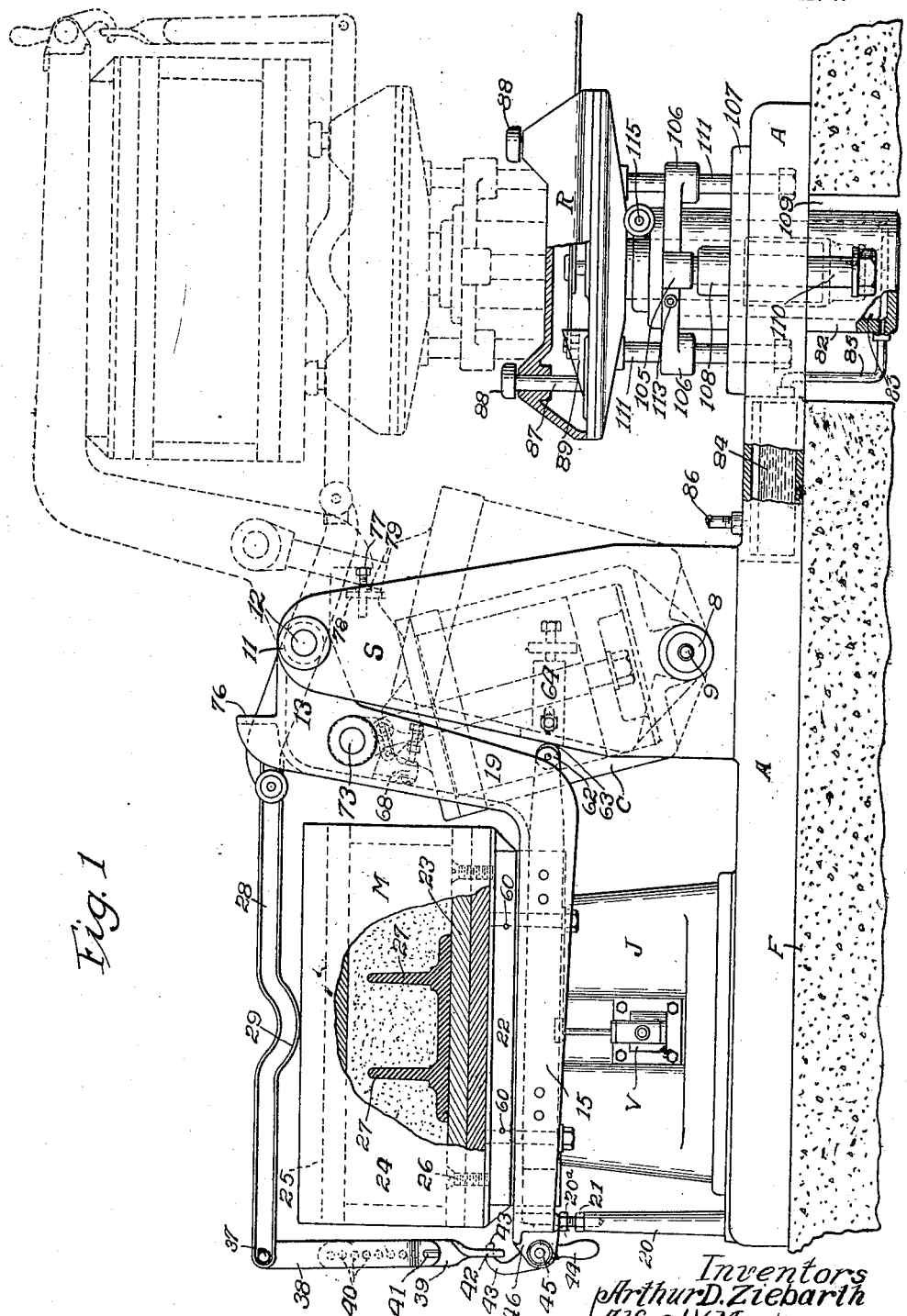

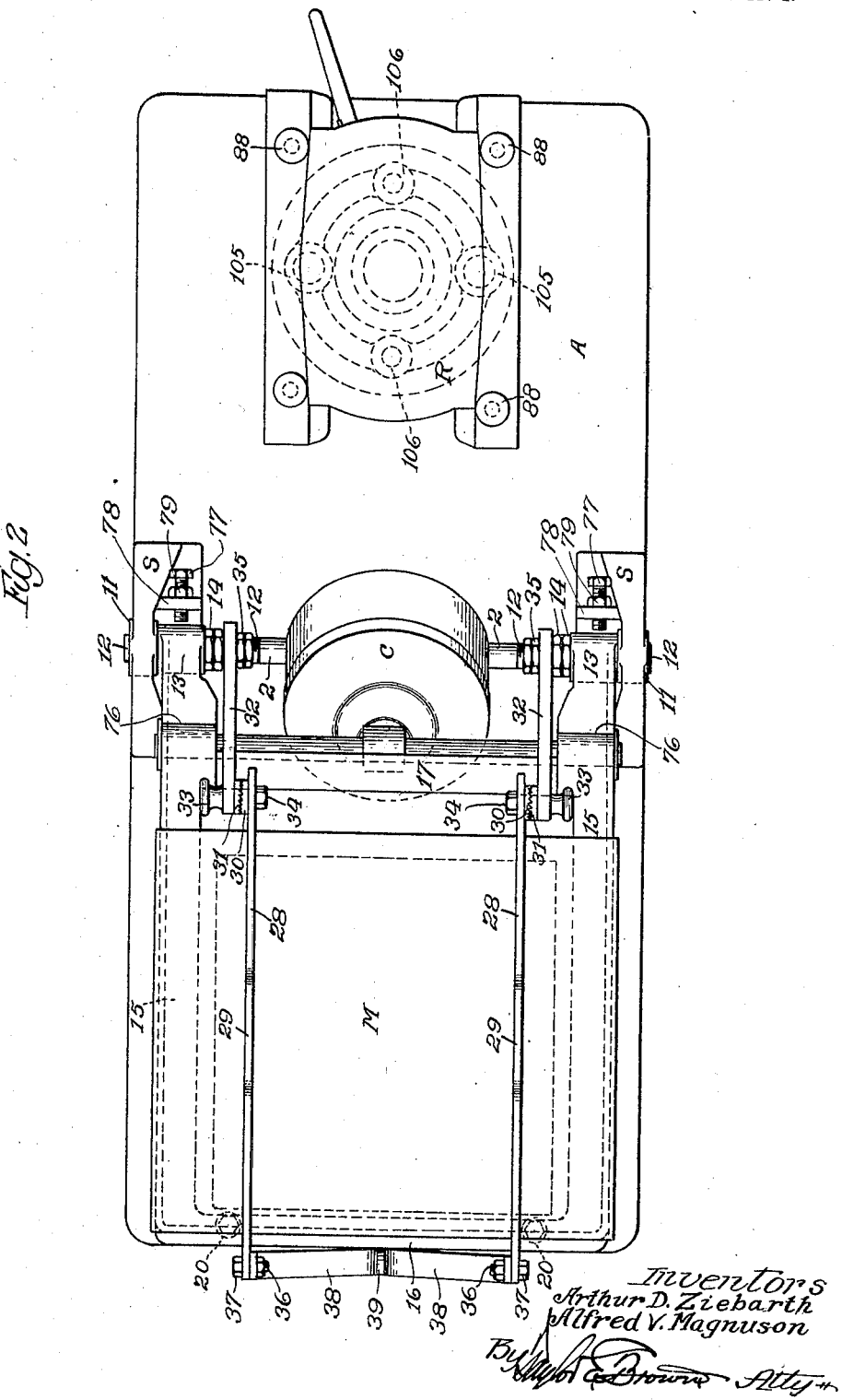

A. D. ZIEBARTH AND A. V. MAGNUSON.
MOLDING MACHINE.
APPLICATION FILED DEC. 30, 1918.
1,316,666.
Patented Sept. 23, 1919.
4 SHEETS—SHEET 4.
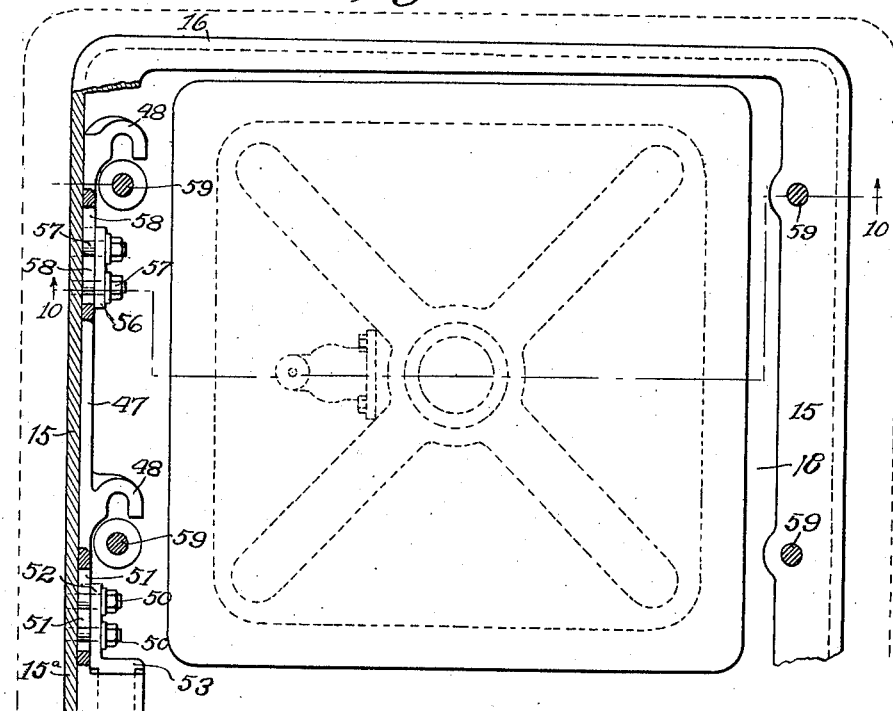
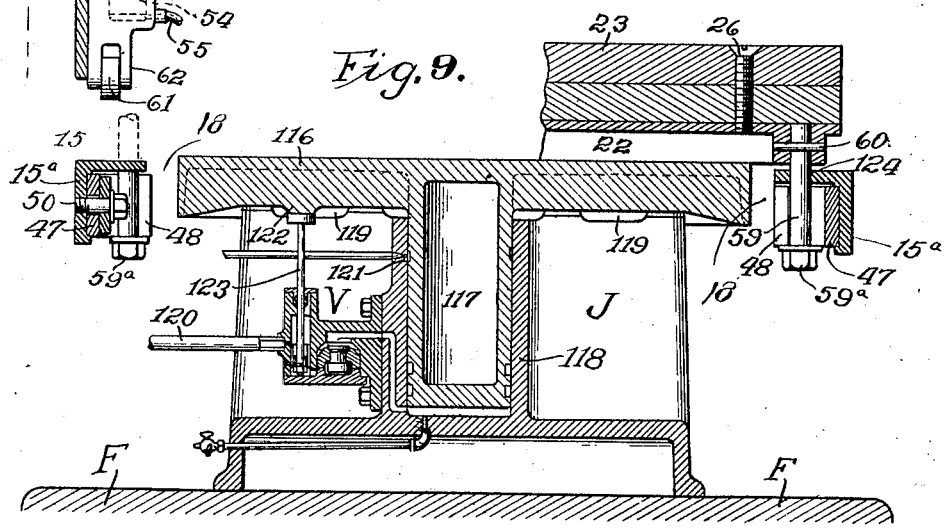
Inventors
Arthur D. Ziebarth.
Alfred V. Magnuson.
By
Taylor & Brown Atty.

UNITED STATES PATENT OFFICE.

ARTHUR D. ZIEBARTH, OF DAVENPORT, IOWA, AND ALFRED V. MAGNUSON, OF BERWYN, ILLINOIS, ASSIGNORS TO DAVENPORT MACHINE & FOUNDRY COMPANY, OF DAVENPORT, IOWA, A CORPORATION OF IOWA.

MOLDING-MACHINE.

1,316,666.  Specification of Letters Patent.  Patented Sept. 23, 1919.

Application filed December 30, 1918. Serial No. 268,887.

*To all whom it may concern:*

Be it known that we, ARTHUR D. ZIEBARTH and ALFRED V. MAGNUSON, citizens of the United States, and residents of Davenport, county of Scott, State of Iowa, and Berwyn, in the county of Cook and State of Illinois, respectively, have invented certain new and useful Improvements in Molding-Machines; and we do hereby declare that the following is a full, clear, and exact description thereof, reference being had to the accompanying drawings, and to the letters of reference marked thereon, which form a part of this specification.

This invention relates to molding machines of the roll-over, drop mold type, and has for one of its objects the construction of a machine in which the mold may be inverted and returned to its initial position, that is the "roll-over" operation be accomplished, by a pushing instead of a pulling movement of a fluid pressure cylinder suitably mounted, so as to oscillate for this purpose, thereby effecting a great saving in fluid pressure consumed and a considerable reduction in friction, and also effecting a material lessening of the wear upon the various parts involved.

Another object of the invention is to dispense with flexible and movable connections for supplying the fluid pressure to the roll-over cylinder, accomplishing this object by locating a suitable conduit in a rotating element and operatively connecting the said conduit with the inlet port of the cylinder as well as with the source of fluid pressure supply.

Another object of the invention relates to automatic means for effecting a locking of the flask and other parts to be lifted by the roll-over element to said element, said means including a fluid pressure cylinder set into operation and controlled by the movement of the means for accomplishing the roll-over operation.

Another object of the invention is to employ means to avoid the usual tendency to jar and injure the mold when rolled over and brought to rest in its inverted position, said means including a shock absorbing unit, so located and so acting as to yieldingly engage and gradually stop the roll-over movement.

Another object of the invention is to so construct the table which supports the mold in its initial position, as to permit of the action of a jolting machine to be applied thereto without disturbing the position of the roll-over element or the mold supporting means. Another object is to so unite the flask to the roll-over element as to permit of inverting the flask without disturbing the jolting element.

Another object of the invention is to provide a construction whereby a plurality of cylinders may be utilized to effect the roll-over movement, thus greatly increasing the capacity of the machine, particularly as to heavy work.

Another object of the invention is to produce a strong, durable and effective structure, which may be easily manipulated without getting out of order, and which will reduce the cost of repairs to a negligible quantity.

These and other objects of the invention will be fully comprehended as we proceed with our specification.

In the form of our invention illustrated in the accompanying drawings:

Figure 1 is a side elevation of the molding machine with certain parts in sectional view and certain parts in dotted lines to illustrate the operation.

Fig. 2 is a plan view of the machine with the holding flask clamped in its initial position and ready to be inverted to the position shown in dotted lines in Fig. 1.

Fig. 3 is a sectional elevation showing parts of the supporting standards, and of the lower end of the roll-over cylinder and the rock shaft, to which the cylinder is secured.

Fig. 4 is a side elevation of a part of the standard and one of the roll-over arms.

Fig. 5 is a side elevation of the dash-pot or cushion unit attached to the inside of one of the supporting standards, showing the position of the roll-over arm when its movement is stopped by said unit.

Fig. 6 is a side elevation of an adjustable stop on the supporting standard.

Fig. 7 is a detail view illustrating the bell crank valve operating lever and the cam for actuating it.

Fig. 8 is a plan view, somewhat enlarged and partially in horizontal section, showing the roll-over frame and the table of the jolting unit.

Fig. 9 is a vertical, sectional view, taken upon the line 10—10 of Fig. 8.

First describing in general terms the machine thus illustrated, we point out that the pattern to be molded is first secured upon a pattern plate, usually by an intermediate pattern board, the pattern plate resting upon a suitable supporting roll-over element, having projecting arms by which said element is pivotally connected to the main frame and operatively connected with a fluid pressure cylinder. This "roll-over" element is designed to lift the flask and mold from its initial position at one end of the machine, to an inverted position at the opposite end. Said roll-over element is centrally apertured and so located with respect to a jolting element as to permit the jolt table to be moved up through the aperture in the roll-over element and raise the pattern plate, pattern and flask and then lower them to permit of the familiar "jolting" action to the flask.

The flask having been placed about the pattern and the sand filled in and the desired jolting operation having taken place, a bottom board is then placed on top of the flask and these parts are suitably clamped together and to the roll-over element by a suitable clamping arrangement. A locking arrangement is also attached to the roll-over element, so as to lock the pattern plate and flask to the roll-over element.

The roll-over element is then operated by a suitable fluid pressure cylinder which pushes the roll-over element and flask upwardly from its initial position, "over the center" and into a flask inverted position, the cylinder being mounted upon a rock shaft for this purpose. When the flask carried by the roll-over element is in the proper inverted position, a supporting table is raised up to the bottom board of the flask member and properly adjusted, so that the flask may rest and be supported thereon. The clamping device is then released and the supporting table lowered. The bottom board and flask are thus drawn downwardly, so as to effect a "drop mold" separation of the flask and mold from the pattern, the latter being still locked to the roll-over element. Fluid pressure is then again directed to the cylinder, causing the roll-over element to move back into its initial position, when the operation may be repeated.

Having thus described the general operation of the machine, we now proceed to describe that embodiment of our invention illustrated in the drawings.

In said drawings, A represents the base of the molding machine which may be set upon a concrete foundation F. S, S are supports or standards on the base A. J designates the jolting machine unit as a whole, M the flask as a whole, C the roll-over operating cylinder, R the supporting table unit as a whole.

The supporting standards, S, S, are located centrally of the length of the base A, one at each side margin thereof, as more clearly indicated in Fig. 2. Near the lower part of these standards are provided journal bearings through the inturned hubs 1, to receive and support the ends of the rock shaft 2. The roll-over cylinder C is provided at its lower end with an apertured extension bearing lug 3 through which the rock shaft 2 is passed, as shown in Fig. 3. Said cylinder is firmly secured to said rock shaft by means of suitable bolts 4 or otherwise.

A conduit 5 extends longitudinally of the shaft 2 from one end thereof, its inner end being in open communication with an inlet port 6 in the cylinder C. The outer end of the shaft is recessed to receive a suitable packing ring 7 held in position by the inwardly directed flanged bushing 8, to which bushing a pipe 9 is secured, said pipe 9 connecting with a suitable source of fluid pressure,—not shown.

It will be manifest, by reference to said Fig. 3, that when the fluid pressure is permitted to flow through the pipe 9, it will pass through the conduit 5 and the inlet port 6 to the interior of the cylinder C and actuate the piston 10 in said cylinder; and, furthermore, that this action will not be impaired either by leakage or by the fact of oscillation of the cylinder C, as the shaft 2 is rocked.

In suitable bearings 11 in the upper end of each of the standards S, is an inwardly directed stud or stub shaft 12, on which an extension arm 13 of the roll-over unit is pivotally mounted; said arm 13 being properly locked against longitudinal movement on said stud 12 by jam nuts 14. The roll-over unit, shown more particularly in Figs. 1, 2 and 8, consists of a rectangularly shaped frame member comprising two L-shaped sides 15, 15, a similarly shaped outer end 16 connecting said sides, and an inner transverse end member 17 connecting said sides 15, 15, thus leaving an open, rectangular space 18 between said sides 15, 15, and the ends 16 and 17. It will be observed by reference to Figs. 1 and 2 that the sides 15 extend upwardly beyond the end member 17, as shown at 19, until they join the part 13. Thus the roll-over unit comprises an open frame having two upwardly and rearwardly extending arm members, 13, 19, pivotally mounted upon the stub shafts 12.

When in the initial position, as illustrated in Fig. 1, the front member 16 of the roll-over unit rests upon and is supported by one or more standards 20 which may extend upwardly from the base A. The supporting surface may be adjusted by bolts 20ª and jam-nuts 21, the member 16 contacting with the bolt heads.

The flask unit M may comprise a pattern plate 22, a pattern board 23, a flask body 24 and a bottom board 25, the pattern board and pattern plate being secured together by screws 26, 26, as shown, or by other suitable means, and the pattern, *per se*, (indicated at 27) being suitably secured to the pattern board 23. 28 is the flask clamp arm, preferably provided with a central, elongated depressed or bended portion 29, adapted to rest upon the bottom board 25 of the flask. This clamp arm 28 is provided at its inner end with a laterally arranged, circular boss 30, with a serrated face adapted to register with a similar face on a boss 31 located on the shorter arm 32. The flask clamp arm 28 and the arm 32 are firmly united by means of a bolt 33 and nut 34, the bolt passing through suitable apertures in the said arms 28 and 32 and the two bosses 30, 31, as more clearly shown in Figs. 1 and 2. The arm 32 is pivotally mounted upon the inner end of the stub shaft 12, to which the roll-over element is hinged, and is securely locked in position by means of jam-nuts 35, 35.

To the forward end of each flask clamp arm 28, of which there are two, and suitably hinged thereto by bolts and nuts 36, 37, are two link members 38, 38, which are bended toward each other to unite with a third link member 39, provided with a plurality of transversely arranged apertures 40, therethrough, by which the links 38, 38, are adjustably secured to the link 39 by a pin 41. The lower end of the link 39 is also provided with an aperture 42 adapted to receive the clamping hook end 43 of a clamp lever 44. This clamp lever 44 is pivotally mounted at 45 to a suitable bracket 46 on the front end 16 of the roll-over frame unit.

It will thus be seen that after the bottom board 25 has been placed on the flask 24, and by swinging the clamp arm 28 into the position shown in Fig. 1, and uniting the clamping hook 43, 44, with the end of the link 39, said flask unit M comprising the bottom board, the flask proper, the pattern board and pattern plate will be firmly clamped together and to the roll-over frame, so that they will not be disturbed or the parts shifted during the roll-over operation.

In the inverted position of the flask, as shown in dotted lines in Fig. 1, and after the clamping mechanism just described is released, it will be necessary to hold the pattern plate and pattern board to the roll-over frame in order to effect the drop-mold separation of the flask and mold from the pattern and pattern board. This is accomplished by the unique mechanism which we will now proceed to describe, reference being had more particularly to Figs. 1, 2, 8 and 9.

On the inside of each of the vertical flanges 15ª of the roll-over frame, and arranged on edge so as to slide longitudinally of the length of said flange, is a sliding bar or plate member 47 provided with two laterally and inwardly directed projecting hook members 48, 48, and provided also with an air pressure locking cylinder 49. For convenience in description and drawing, this cylinder 49 is shown as integral with said sliding bar or plate member 47. Secured to the side flange 15ª by bolts 50, 50, which bolts pass through a longitudinally arranged slot 51, in the said slide member 47, is an angle plate bracket 52, the inturned arm 53 of which constitutes one of the cylinder heads and supports the piston 54 (shown in dotted lines) of the locking cylinder 49. As shown, this piston may be integral with the head or arm member 53 of the bracket 52, or may be otherwise rigidly secured to the flange 15ª. Through a conduit 55 suitably connected, as hereinafter shown with a source of supply, fluid pressure is supplied to the cylinder 49, and when so supplied, moves the cylinder lengthwise in a direction away from the stationary piston 54; such movement causing the bar 47 to move with it.

A guide bracket 56 is secured to the side flange 15ª of the roll-over frame by suitable bolts 57, 57, which bolts pass through a longitudinal slot 58 in the slide bar 47. Thus the member 47 is shown to have as guide bearings, the inside of the flange 15ª and the side of the brackets 52 and 56.

Depending from each side of the pattern plate 22 are two bolts 59, 59. These bolts 59 are secured to the pattern plate 22 by transversely arranged pins 60, 60, see Figs. 1 and 9. Said bolts pass downwardly through suitable apertures in the top sides 15 of the roll-over frame, and hang in the path of the hook members 48, 48 of the sliding arms 47. Thus it will be seen that when the cylinder 49 is moved away from the stationary piston 54, that is to say, moved to the right when looking at Fig. 1, said hook members 48, 48, will engage and be firmly held against the depending bolts 59, 59, thus locking the pattern plate 22 and the roll-over frame member firmly together. When said roll-over member, to which is clamped the flask unit M, is in the inverted position illustrated in dotted lines in Fig. 1, and when the clamp lever 42 is disengaged from the link 39 and the flask clamping device thus released, the locking arrangement of the hooks 48 and bolts 59 just described will firmly hold the pattern plate 22 and the pattern board and pattern 23, attached thereto, to said roll-over frame and prevent them from following when the flask and mold are withdrawn downwardly in the "drop-mold" separation. When the parts are returned to their original position and the fluid pressure released from the cylinder 49, the latter will be pushed back to its original position, as shown in Fig. 8, by reason of the fact that the anti-friction roller 61 carried on an extension 62 of said cylinder 49, will contact with the surface 63 of the frame 64, bolted at 65 on the standard S and thus move the said cylinder and the sliding bar 47 (toward the left of the machine when looking at Fig. 1), to disengage the hook members 48 from the depending bolts 59,—this movement being caused by the return movement of the roll-over member. To insure accuracy of operation in this unlocking action, each stop member 64 (there being one on the inner face of each standard S) is made adjustable by means of an adjusting bolt 66 which engages a rib 67 on the standard S, a slot 68 permitting the frame 64 to slide over the bolt 65. These parts must be disengaged when the pattern plate and pattern board are in the initial position shown in Fig. 1, because after the flask is placed upon the pattern board and filled with sand, it is desirable to subject the flask unit M to the action of the jolting element, and this means raising and dropping said unit without raising the roll-over frame. Such jolting action could not be effected if the pattern plate were still locked to the said roll-over element. It will be understood, of course, that when the jolting element is in operation, the bolts 59, 59 will be free to slide up and down,—that is, slide longitudinally through the guide apertures in the side members 15 of the roll-over frame.

Although the fluid pressure may be supplied to the two locking cylinders 49, 49, through the conduits 55, 55, from any suitable source of supply, and by a hand operated valve, we prefer to supply such pressure by automatic means controlled by the action of the roll-over cylinder piston. One such means we have partly illustrated in dotted lines in Fig. 1 and in Fig. 7, such means including a valve 68, to which the conduit 55 is operatively connected, provided with a movable valve stem 69. Fluid pressure is admitted to the valve 68 at 70 and the conduit 55 is branched, as shown in Fig. 7, one branch leading to one and the other to the opposite cylinder 49. The valve stem 69 is suitably connected with one end of a bell crank lever 71. The other end of the bell crank lever is provided with an antifriction roller 72. Upon the piston rod shaft 73 of the roll-over cylinder C, we provide a cam member consisting of a disk 74 provided with a concave portion 75 in its periphery. This concave portion, when the cylinder C is at rest, contacts with and is filled by the margin or periphery of the roller 72 of the bell crank lever 71. The valve stem 69 is then in such position as to close the valve 68 and prevent fluid pressure passing through the conduits 55 to the cylinders 49. As soon as the roll-over cylinder C begins its operation, and the said piston 10 thereof begins to move, it travels in such an orbit as to cause the roller 72 to roll out of said concave surface 75 and to contact with the periphery of said cam disk 74; thus actuating the bell crank lever 71 to force the valve stem 69 inwardly to open the valve 68. Fluid pressure will immediately pass to the locking cylinders 49. In the return operation, and when the parts are about to assume their initial position as shown in Fig. 1, the roller 72 again engages the concave portion 75, thus shutting off the admission of fluid pressure to the cylinders 49 and permitting the roller 62 to contact with the surface 63 and actuate the cylinders 49 to cause the unlocking of the hooks 48 from the bolts 59 as before explained. We regard this automatic control of the locking unit as a very desirable feature of our invention.

A stop shoulder 76 is suitably located on each of the arms 13 of the roll-over element, and in an appropriate location on the supporting standards S of the main frame, we locate a contacting stop element. In one form, (as shown in Fig. 1) this stop element consists of a bolt 77 adjustably held in a suitable bracket or lug 78, shown in dotted lines, by a jam-nut 79.

However, in some of the machines, we prefer to use a yielding stop element, such, for example, as is shown in Figs. 4 and 5. As indicated in said figures, D is a dash-pot cylinder unit, as a whole, suitably secured by bolts 80 to the inside of the standard S and provided with a projecting piston stop plug 81, the end of which is adapted to contact, as shown, with the stop shoulder 76 on the arm 13 of the turn-over element. The dash-pot cylinder may be filled with oil or other slow acting fluid and will operate in the usual manner to yieldingly permit the roll-over element to come to rest without a jar or jolt Any suitable and well-known dash-pot unit may be used for this purpose, and therefore we do not further describe the details thereof.

At the right hand end of the base A of the machine, we provide a flask receiving table R. This table is actuated on vertical lines by means of a fluid pressure cylinder 82. The piston 83 of this cylinder has of course a limited but predetermined range of movement, and in order that the withdrawal movement of the receiving table R and flask may be properly effected, I prefer to locate in the base A of the machine, an auxiliary chamber 84, suitably connected by a conduit 85 with the inlet port of the cylinder 82, and filled almost to capacity with oil. Fluid pressure from any suitable source of supply is admitted to the oil chamber on top of the oil through the medium of the conduit 86.

The receiving table R is hollow, as shown in Fig. 1 by means of the broken away portion, and is provided at each of its four corners with apertures constituting guide bearings for the stems 87 of adjusting blocks 88. The lower ends of these stems 87 are somewhat tapered as illustrated in Fig. 1, and rest upon wedge blocks 89. An operating handle is suitably connected by toggle levers or otherwise to the wedges 89, to in turn move the blocks 88 to effect a final adjustment of the table R beneath the inverted flask M, after the table has been raised from the position shown in full lines to that shown in dotted lines in Fig. 1. After the flask has been released from the roll-over arms 15, the table R is lowered to effect the familiar "drop mold" separation of the flask and mold from the pattern.

Any suitable flask and pattern separating means may of course be employed, but we prefer to use the unique drop mold mechanism illustrated. Inasmuch, however, as we have fully illustrated this mechanism and described and claimed it in a separate divisional application, Serial No. 288,778, filed on the 9th day of April, 1919 to which reference is hereby invited, we refrain from making any further detail description thereof herein.

We make no claim, *per se*, to the jolting unit shown in Figs. 1, 8 and 9, except in combination with the other features of our machine, and hence will only give such description thereof as seems necessary to an understanding of its general operation.

The jolting machine J comprises the usual table 116, carrying on its lower end and projecting preferably from its center, a piston 117 adapted for vertical movement within a cylinder 118 The lower side of the table is provided with such strengthening ribs as may be necessary, and is adapted to contact and rest upon stop members 119 preferably of some resilient material. Fluid pressure is admitted from a suitable source of supply through the conduit 120, and regulating valve V to the lower end of the cylinder 118, having the usual discharge port 121. When so admitted, the pressure will cause the jolt table 116 to be raised. This jolt table, as shown, is located within the open space 18 of the frame of the roll-over element, so as to be free to move vertically without disturbing the position of the roll-over element frame. The pattern plate 22 rests on top of the jolt table 116. A lug 122 on the under side of the table 116 will contact with the stem 123 of the valve unit V to open the latter to supply pressure to the cylinder each time the jolt table is lowered.

It will be understood, particularly by reference to Figs. 8 and 9, that the location of the bolts 59, and of the guide apertures through which they pass, is such that the head of the bolt during the up and down jolting movement, will be clear and free from engagement with the locking elements heretofore described, and yet in proper position to be engaged by the locking hooks 48 when the jolting operation is finished.

We claim as our invention:

1. A rockover molding machine comprising a standard or support, a roll-over element hinged thereto, a rocking element movably mounted in the standard, a fluid pressure cylinder secured to the rocking element and operatively connected with the roll-over element, and means for supplying fluid pressure to the cylinder through the rocking element.

2. A rockover molding machine comprising a standard or support, a rocking element movably mounted thereon, a fluid pressure cylinder secured to the rocking element, a flask supporting, roll-over element pivotally mounted on the standard above the cylinder and also pivotally connected with the cylinder piston rod whereby the thrust or push of the latter will operate the roll-over element and means for supplying fluid pressure to the cylinder through the rocking element.

3. In a molding machine of the roll-over, drop mold type comprising a standard or support, a roll-over element hingedly mounted on said support, a flask unit, means for clamping the latter to the former, means for actuating the roll-over element to invert the flask unit and means on the support to yieldingly engage and gradually arrest the movement of the roll-over element.

4. In a molding machine of the roll-over, drop mold type comprising a standard or support, a roll-over element hingedly mounted on said support, a flask unit, means for clamping the latter to the former, means for actuating the roll-over element to invert the flask unit and means on the support to yieldingly engage and gradually arrest the movement of the roll-over element, said means comprising a dash pot unit.

5. A rockover molding machine comprising a standard or support, a rock shaft element movably mounted thereon, a flask supporting, roll-over element pivotally mounted on the standard above the point of support of the rock shaft element, a fluid pressure cylinder secured to and movable with the rocking element and having its piston pivotally connected with the roll-over element below the point of connection of said roll-over element with said standard, whereby the thrust of the cylinder piston will operate the roll-over element, and means for supplying fluid under pressure to the cylinder through the rock shaft element.

6. A molding machine of the roll-over, drop mold type, comprising a base, a standard or support, a roll-over element comprising an open frame hingedly united to said support, a jolt element on the base including a movable jolt table, a flask unit adapted to initially rest on said table and within the opening in the frame of the roll-over element, means for clamping the flask unit to the roll-over element, means for locking a portion of the flask unit to the roll-over element independently of said clamping means, means for operating the roll-over element to invert the flask unit and means associated with the roll-over means for automatically actuating said locking means.

7. A molding machine of the roll-over, drop mold type, comprising a base, a standard, or support thereon, a roll-over element comprising an open frame hingedly mounted to said support, a movable jolt table, a flask unit adapted to initially rest upon said table and within the opening in the frame of the roll-over element, said flask element comprising separable parts, means for operating the roll-over element to invert the flask unit, means for holding the flask unit as a whole clamped to the roll-over element during its movement, coöperative locking means on said roll-over element and a portion of the flask unit, means for engaging said coöperative locking means, said engaging means including a fluid pressure cylinder on the roll-over element in operative engagement with said locking means.

8. A molding machine of the roll-over, drop mold type, comprising a base, a standard or support thereon, a roll-over element comprising an open frame hingedly mounted to said support, a movable jolt table, a flask unit adapted to initially rest upon said table and within the opening in the frame of the roll-over element, said flask element comprising separable parts, means for operating the roll-over element to invert the flask unit, means for holding the flask unit as a whole clamped to the roll-over element during its movement, coöperative locking means on said roll-over element and a portion of the flask unit, means for engaging said coöperative locking means, said engaging means including a fluid pressure cylinder on the roll-over element in operative engagement with said locking means, and means for automatically operating said locking cylinder.

9. A molding machine of the roll-over, drop mold type, comprising a base, a standard or support thereon, a roll-over element comprising an open frame hingedly mounted to said support, a movable jolt table, a flask unit adapted to initially rest upon said table and within the opening in the frame of the roll-over element, said flask element comprising separable parts, means for operating the roll-over element to invert the flask unit, means for holding the flask unit as a whole clamped to the roll-over element during its movement, coöperative locking means on said roll-over element and a portion of the flask unit, means for engaging said coöperative locking means, said engaging means including a fluid pressure cylinder on the roll-over element in operative engagement with said locking means, and means actuated by the movement of the roll-over element to automatically operate the locking cylinder.

10. A molding machine of the roll-over, drop mold type, comprising a hinged roll-over element, a flask unit, coöperative locking means on the roll-over element and on a portion of the flask element including bolts fixed to the flask element and locking hooks slidably mounted in the roll-over element, a fluid pressure cylinder operatively connected with said sliding means, a valve unit for supplying fluid pressure to said locking cylinder, means for actuating the roll-over element to invert the flask, a cam on said roll-over element and operative connections between said cam and said valve unit for controlling the supply of fluid pressure to said locking cylinder through the valve unit by the movement of the roll-over element.

11. A molding machine of the roll-over, drop mold type, comprising a standard or support, a roll-over element hingedly secured thereto, an oscillating cylinder operatively connected with said element, a flask element embracing a separable pattern plate, means on the roll-over element for holding the flask unit as a whole clamped to said element during its movement to invert the flask, locking bolts secured to the separable pattern plate, a locking bar slidably mounted in the roll-over element and provided with locking hooks adapted to engage said bolts, a cylinder secured to said sliding bar, a piston rigidly mounted at one end to said roll-over element and projecting at its other end into said cylinder, and means for supplying fluid pressure to said cylinder to force the latter away from the piston and thus cause operative engagement of said locking hooks with said bolts.

12. A molding machine of the roll-over, drop mold type, comprising a standard or support, a roll-over element hingedly secured thereto, an oscillating cylinder operatively connected with said element, a flask element embracing a separable pattern plate, means on the roll-over element for holding the flask unit as a whole clamped to said element during its movement to invert the flask, locking bolts secured to the separable pattern plate, a locking bar slidably mounted in the roll-over element and provided with locking hooks adapted to engage said bolts, a cylinder secured to said sliding bar, a piston rigidly mounted at one end to said roll-over element and projecting at its other end into said cylinder, and means for supplying fluid pressure to said cylinder to force the latter away from the piston and thus cause operative engagement of said locking hooks with said bolts, an extension on said cylinder and means on said standard or support adapted to contact with said extension upon the return of the roll-over element to its initial position, whereby the said cylinder is moved relatively to the roll-over element to disengage said locking means.

13. A molding machine of the roll-over, drop mold type comprising a hinged, roll-over element, a flask unit, coöperative locking means on the roll-over element and on a portion of the flask element including locking bolts fixed to the flask element and locking hooks movably mounted in the roll-over element, a fluid pressure cylinder operatively connected with said movable locking hooks, a valve for supplying fluid pressure to said locking cylinder, means for actuating the roll-over element to invert the flask, a valve stem in said valve, a bell crank lever connected to said valve stem, a cam roller on said bell crank lever, a cam disk on the roll-over element, a depression in said cam disk adapted for engagement with said cam roller, the position of the cam roller with respect to the cam disk being such that the roller will alternately engage the depression and then the peripheral margin of said cam disk to actuate the valve stem for controlling the supply of fluid pressure to said locking cylinder, said valve being stationary with respect to the roll-over element and the cam disk being rotatively movable with respect to the roll-over element.

14. A molding machine of the roll-over, drop mold type, comprising a flask unit, a roll-over element, means for clamping the former to the latter, a fluid pressure cylinder and piston operatively connected with the roll-over element and adapted by the push or thrust of the piston to actuate the roll-over element to invert the flask, a rock shaft and bearings therefor, means for securing the cylinder to said rock shaft, and means for supplying fluid pressure to the cylinder through the rock shaft and one of its bearings.

15. A molding machine of the roll-over, drop mold type, comprising a flask unit, a roll-over element, means for clamping the former to the latter, a fluid pressure cylinder and piston operatively connected with the roll-over element and adapted by the push or thrust of the piston to actuate the roll-over element to invert the flask, a rocking element connected to said cylinder and bearings for said rocking element, said rocking element comprising a shaft, a conduit in said shaft, the latter being suitably connected at one end to the inlet port of the cylinder and at the other end to a source of fluid pressure supply.

16. A molding machine of the roll-over, drop mold type comprising a roll-over element, a flask unit and means for clamping the latter to the former, an oscillating cylinder operatively connected with the roll-over element, a rock shaft suitably mounted in bearings in the machine frame, an apertured lug on said cylinder through which the rock shaft may pass, means for locking said lug to said rock shaft, a conduit leading from one end of the rock shaft toward its center, a transversely arranged port connecting the inner end of said conduit with the piston chamber of said cylinder, a bushing nut on the open end of said rock shaft, a packing between said bushing and said shaft and means attached to said bushing for supplying fluid pressure to said conduit.

In testimony that we claim the foregoing as our invention we affix our signatures, in the presence of two witnesses, this 21st day of December, A. D. 1918.

ARTHUR D. ZIEBARTH.
ALFRED V. MAGNUSON.

Witnesses:
CARRIE ORTH,
HILDA LANGFELDT.